(12) United States Patent
Shimura et al.

(10) Patent No.: US 8,939,130 B2
(45) Date of Patent: Jan. 27, 2015

(54) EVAPORATED FUEL TREATMENT DEVICE FOR VEHICLE

(75) Inventors: Takeshi Shimura, Wako (JP); Shinji Kobayashi, Wako (JP); Ikuo Hara, Wako (JP); Takuma Koishikawa, Wako (JP); Satoshi Okayama, Wako (JP); Takeshi Uemae, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 514 days.

(21) Appl. No.: 13/401,403

(22) Filed: Feb. 21, 2012

(65) Prior Publication Data
US 2012/0240906 A1 Sep. 27, 2012

(30) Foreign Application Priority Data
Mar. 23, 2011 (JP) .................... 2011-064711

(51) Int. Cl.
| F02M 33/02 | (2006.01) |
| B60K 15/04 | (2006.01) |
| B60K 15/035 | (2006.01) |
| F02M 25/08 | (2006.01) |

(52) U.S. Cl.
CPC ....... *B60K 15/0406* (2013.01); *B60K 15/03519* (2013.01); *F02M 25/0836* (2013.01); *F02M 25/089* (2013.01)
USPC .......................................... 123/521; 220/210

(58) Field of Classification Search
CPC .................. F02M 25/0854; F02M 25/0872
USPC ............ 123/518–521, 198 D, 198 E; 220/210
See application file for complete search history.

(56) References Cited

U.S. PATENT DOCUMENTS

| 4,312,649 | A | * | 1/1982 | Fujii et al. ...................... 96/109 |
| 7,677,277 | B2 | * | 3/2010 | Thompson et al. ........... 141/350 |
| 8,813,725 | B2 | * | 8/2014 | Shimura et al. ............... 123/519 |
| 2012/0255525 | A1 | * | 10/2012 | Shimura et al. ............... 123/519 |

FOREIGN PATENT DOCUMENTS

JP   5-246367 A   9/1993

* cited by examiner

*Primary Examiner* — Hieu T Vo
*Assistant Examiner* — Sherman Manley
(74) *Attorney, Agent, or Firm* — Birch, Stewart, Kolasch & Birch, LLP (57) ABSTRACT

An evaporated fuel treatment device is provided to treat evaporated fuel by using a fuel supply cap with a small size while the flowout of fuel can also be suitably prevented. The evaporated fuel treatment device includes a positive pressure adjusting valve which opens when an inner pressure of a fuel tank becomes a predetermined pressure or more, and a spherical rollover valve which closes the positive pressure adjusting valve when the fuel tank is inclined at an angle equal to or larger than a predetermined angle. The positive pressure adjusting valve and the spherical rollover valve are mounted on one cylindrical portion formed on a fuel supply cap.

14 Claims, 8 Drawing Sheets

EVAPORATED FUEL TREATMENT DEVICE FOR VEHICLE

CROSS-REFERENCE TO RELATED APPLICATIONS

This nonprovisional application claims priority under 35 U.S.C. §119(a) on Patent Application No. 2011-064711, filed in Japan on Mar. 23, 2011, the entirety of which is incorporated herein by reference.

BACKGROUND OF THE INVENTION

1. Field of the Invention

The present invention relates to an evaporated fuel treatment device for a vehicle, and more particularly to an evaporated fuel treatment device for a vehicle which introduces an evaporated fuel generated in the inside of a fuel tank to the outside of the fuel tank by making use of a fuel supply cap.

2. Background of the Invention

JP-A-5-246367 discloses a fuel supply cap of a fuel tank for a motorcycle provided with an evaporated fuel treatment device. The fuel supply cap includes a positive pressure adjusting valve which opens when a tank inner pressure becomes a predetermined pressure or more, and a liquid leakage preventing valve which prevents the flowout of fuel (see JP-A-5-246367 in FIG. 4). The positive pressure adjusting valve in the fuel supply cap is communicated with a canister in the fuel supply cap, and an inner pressure of the fuel tank can be transmitted to a canister side by opening the positive pressure adjusting valve.

In the fuel supply cap of JP-A-5-246367, the positive pressure adjusting valve and the liquid leakage preventing valve are separately provided and are arranged parallel to each other in the lateral direction of the fuel supply cap. Therefore, the size of the fuel supply cap becomes too large. Further, in such a fuel supply cap, a spherical valve is used as a valve for preventing liquid leakage. However, when such a spherical valve is used, it is necessary to take into account the structure which prevents sticking of a spherical body to a valve seat. Also in the constitution where the positive pressure adjusting valve and the liquid leakage preventing valve are arranged parallel to each other in the lateral direction, an attempt to further improve the sticking prevention structure gives rise to a drawback that the fuel supply cap becomes more even larger and complicated. In addition, although the liquid leakage preventing valve is provided to the fuel supply cap, when a fuel tank is inclined, a liquid pressure of fuel is applied to the positive pressure adjusting valve so that fuel intrudes into a canister from a positive pressure adjusting valve side. This weakens the absorption ability of the canister.

On the other hand, although only the positive pressure adjusting valve is provided to the fuel supply cap according to JP-A-5-246367, to reduce the diffusion of evaporated fuel in the tank to the outside, it is desirable to also provide a negative pressure adjusting valve which opens when a tank inner pressure becomes a predetermined pressure or less. However, when the negative pressure adjusting valve is provided to the above-mentioned fuel supply cap in addition to the positive pressure adjusting valve, the fuel supply cap becomes further larger, thereby making the application of the evaporated fuel treatment device to a miniaturized vehicle difficult and/or impossible.

In addition, in the fuel supply cap of JP-A-5-246367, the liquid leakage preventing valve is always communicated with atmospheric air (canister).

SUMMARY OF THE INVENTION

In order to realize miniaturization of the canister while preventing the flowout of an excessively large amount of evaporated fuel, it is desirable to form the fuel tank into a sealed-type fuel tank with respect to this type of evaporated fuel treatment device.

It is an object of the present invention to provide an evaporated fuel treatment device for a vehicle having a sealed-type fuel tank as a fuel tank which allows the fuel tank to be communicated with a canister (evaporated fuel storage unit) only when the fuel tank becomes a predetermined positive pressure or negative pressure by making use of a fuel supply cap and treats evaporated fuel, wherein the evaporated fuel can be treated without making the fuel supply cap large-sized and the flowout of fuel can also be suitably prevented.

To achieve the above-mentioned object, according to a first aspect of the present invention, an evaporated fuel treatment device for a vehicle comprises: a fuel tank for storing fuel; a fuel supply cap for opening and closing a fuel filling port of the fuel tank; an evaporated fuel storage unit storing evaporated fuel using an absorption agent; a charge passage allowing communication between the fuel tank and the evaporated fuel storage unit; a purge passage allowing communication between the evaporated fuel storage unit and an intake system of an internal combustion engine; a communication chamber formed in the fuel supply cap, the communication chamber allowing communication between the charge passage and an inside of the fuel tank, wherein the communication chamber is formed of a pair of cylindrical portions and has one end opened toward the charge passage and the other end opened in an inside of the fuel tank; a positive pressure adjusting valve in one of the cylindrical portions, the positive pressure adjusting valve being opened when an inner pressure of the fuel tank becomes a first predetermined pressure or higher such that the evaporated fuel generated in the fuel tank is supplied to the evaporated fuel storage unit through the one of the cylindrical portions and the charge passage; a negative pressure adjusting valve in the other one of the cylindrical portions, the positive pressure adjusting valve being opened when the inner pressure of the fuel tank becomes a second predetermined pressure or lower such that atmospheric air is supplied to the fuel tank from the evaporated fuel storage unit through the other one of the cylindrical portions and the charge passage; and a spherical rollover valve arranged on a fuel tank inner side of the one of the cylindrical portions, the spherical rollover valve closing the positive pressure adjusting valve when the fuel tank is inclined at an angle equal to or larger than a predetermined angle.

Furthermore, according to a second aspect of the present invention, the positive pressure adjusting valve includes: an annular valve seat projecting in a radially inward direction from an inner peripheral surface of the one of the cylindrical portions; an umbrella portion biasingly brought into contact with an end surface of the valve seat; and a shaft portion joined to the umbrella portion and fitted in an inner peripheral side of the valve seat, wherein the positive pressure adjusting valve is arranged in an inside of the one of the cylindrical portions such that the shaft portion projects from the valve seat in a closed state where the umbrella portion is brought into contact with the valve seat.

Furthermore, according to a third aspect of the present invention, a diameter of the spherical rollover valve is slightly smaller than a diameter of the one of the cylindrical portions by an amount which allows passing of the evaporated fuel.

Furthermore, according to a fourth aspect of the present invention, the fuel supply cap includes a key cylinder and a hinge so that the fuel supply cap is connected to the fuel tank in an openable/closable manner by the hinge, and the positive pressure adjusting valve and the negative pressure adjusting valve are arranged adjacent to each other, and are arranged on a side opposite to the hinge with respect to the key cylinder.

Furthermore, according to a fifth aspect of the present invention, a load obtained by adding a load of the umbrella portion and a load of the shaft portion to a biasing force applied to the umbrella portion is set larger than a load of the spherical rollover valve, a biasing force applied to the umbrella portion is set smaller than the load of the spherical rollover valve, the shaft portion projects from the valve seat with the fuel tank in a standing state thus preventing sticking of the spherical rollover valve to the valve seat, and when the fuel tank is inclined at a predetermined angle or larger, the spherical rollover valve pushes up the shaft portion due to a dead weight thereof and a load which the spherical rollover valve receives from fuel intruding into the inside of the one of the cylindrical portions so that the positive pressure adjusting valve is opened by being pushed spherical rollover valve and the valve seat is closed by the spherical rollover valve.

According to the first aspect of the present invention, the positive pressure adjusting valve and the rollover valve for preventing liquid leakage are arranged parallel to each other in the longitudinal direction of the fuel supply cap (the axial direction of the fuel filling port to be closed). Therefore, an evaporated fuel can be treated while maintaining the fuel supply cap in a compact shape, and the flowout of fuel in the fuel tank can be preferably prevented.

According to the second aspect of the present invention, the shaft portion projects from the valve seat in a state where the fuel tank is not inclined. Therefore, sticking of the rollover valve to the valve seat can be prevented.

According to the third aspect of the present invention, a weight of liquid fuel is loaded on the rollover valve. Therefore, the valve seat can be tightly closed.

According to the fourth aspect of the present invention, by arranging the relatively large key cylinder at a position close to the hinge, it is easily to design a small-sized fuel supply cap which does not interfere with the fuel filling port at the time of opening or closing the fuel tank.

According to the fifth aspect of the present invention, when such load relationship is established, the shaft portion can project from the valve seat with the fuel tank in a standing state with certainty, thus preventing sticking of the rollover valve to the valve seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a) and 5(b) are cross-sectional views of a positive pressure adjusting valve and an area around the positive pressure adjusting valve mounted on the fuel supply cap of the evaporated fuel treatment device according to the first embodiment of the present invention, wherein FIG. 5(a) is a view showing a state where a fuel tank is in a standing state, and FIG. 5(b) is a view showing a state where the fuel tank is in an inclined state so that a rollover valve closes the positive pressure adjusting valve;

DETAILED DESCRIPTION OF THE PREFERRED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

In the drawings which are used in the explanation made hereinafter, symbol UP indicates the upward direction, and symbol FR indicates the frontward direction. For facilitating the explanation of the embodiments, the explanation is made using these directions as the reference in the following embodiments.

First Embodiment

Figure 1:
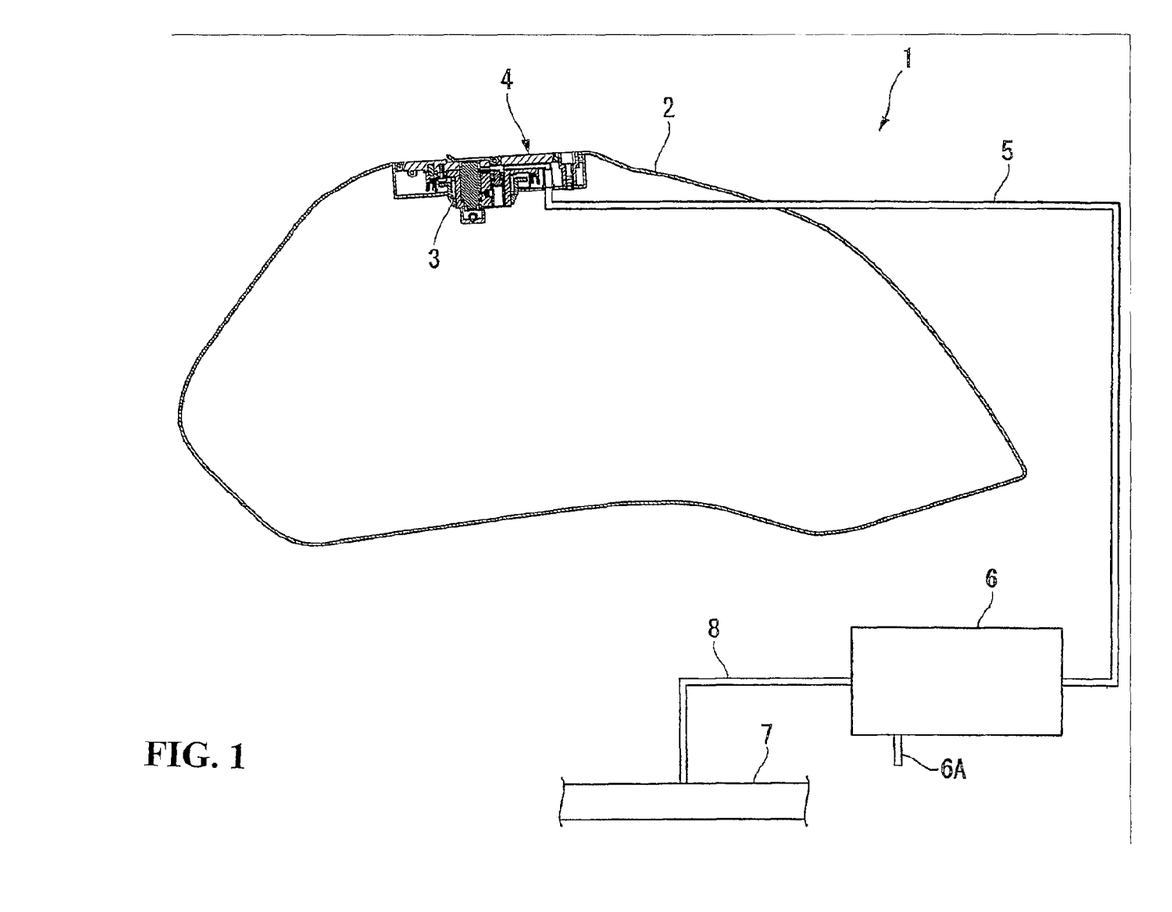
FIG. 1 is a view showing a schematic constitution of an evaporated fuel treatment device according to a first embodiment of the present invention.

FIG. 1 shows a schematic constitution of an evaporated fuel treatment device 1 according to a first embodiment of the present invention, which is applied to a fuel tank of a motorcycle. The evaporated fuel treatment device 1 includes a fuel tank 2, a fuel supply cap 4 mounted on a fuel filling port 3 of the fuel tank 2 in an openable/closable manner, a charge pipe 5 penetrating the fuel tank 2 and connected to the fuel supply cap 4, an evaporated fuel storage unit 6 connected to the charge pipe 5 outside the fuel tank 2, and a purge pipe 8 allowing the evaporated fuel storage unit 6 and a connecting tube 7 which is a member constituting an intake system to be communicated with each other. A drain pipe 6A through which atmospheric air is sucked is mounted on the evaporated fuel storage unit 6.

Figure 2:
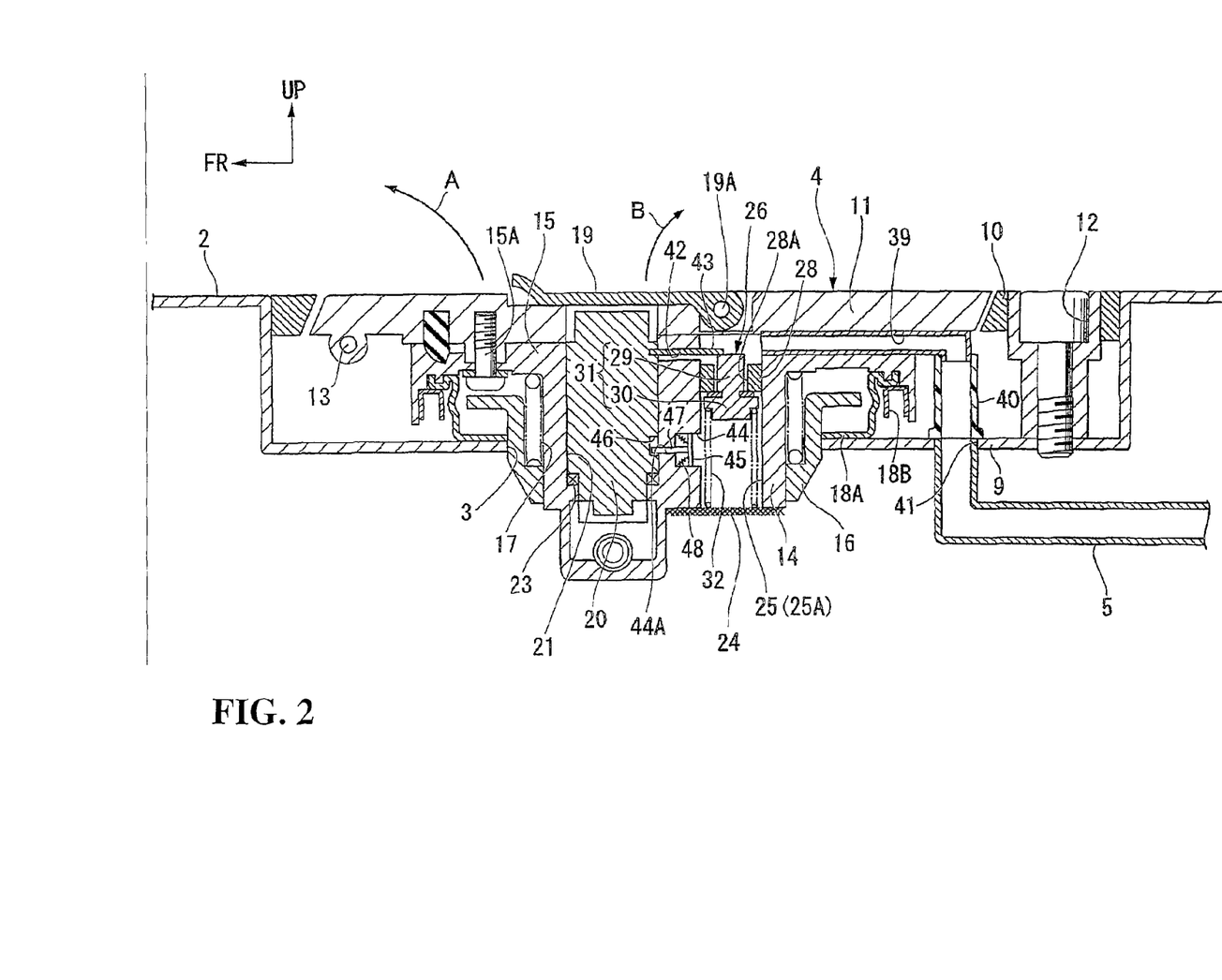
FIG. 2 is a cross-sectional view of a fuel supply cap of the evaporated fuel treatment device according to the first embodiment of the present invention.

As shown in FIG. 2, a seat portion 9 having a recessed shape (as viewed in cross section) which is indented by being bent from an upper outer wall is mounted on the fuel tank 2, and the fuel filling port 3 has a circular shape as viewed in a plan view (i.e., the top plan view) and is formed on an approximately center region of the seat portion 9. The charge pipe 5 is communicated with the inside of the fuel tank 2 through the fuel supply cap 4 and feeds evaporated fuel generated in the inside of the fuel tank 2 to the evaporated fuel storage unit 6 (see FIG. 1). The evaporated fuel storage unit 6 contains an absorption agent therein, and stores evaporated fuel fed from the charge pipe 5 by absorption.

The fuel supply cap 4 includes a circular annular outer frame portion 10 fixed to the seat portion 9 and a cap body 11 arranged inside the outer frame portion 10. In addition, a plurality of sunk holes 12 are formed in the outer frame portion 10. The fuel supply cap 4 is fixed to the seat portion 9 by inserting bolts into the sunk holes 12 formed in the outer frame portion 10. The cap body 11 is connected to the outer frame portion 10 by a hinge 13, and is rotatably openable and closable in the direction indicated by an arrow A in FIG. 2.

A cylindrical tumbler 14 is mounted on a lower surface of the cap body 11. The tumbler 14 includes a flange portion 15 on an upper end periphery thereof as an integral part thereof, and the tumbler 14 is fixed to the lower surface of the cap body 11 by a plurality of screws 15A which penetrate the flange portion 15. A sealing member 16 made of a resin material is fitted on the tumbler 14 in a state where the sealing member 16 is brought into pressure and physical contact with an inner peripheral surface of the fuel filling port 3. The sealing member 16 is downwardly biased by a spring 17 which has one end brought into contact with an inner peripheral side of the flange portion 15 of the tumbler 14.

An upper end portion of the sealing member 16 is bent in the outer peripheral direction, and the bent portion is brought into contact with a restricting member 18A which extends downwardly from an outer peripheral side of the flange portion 15 of the tumbler 14. Therefore, the position of the sealing member 16 is restricted. As shown in FIG. 2, a fixing member 18B is used for fixing the restricting member 18A.

A key cover 19 is rotatably opened or closed in the direction indicated by an arrow B in FIG. 2, and is connected to an upper portion of the cap body 11 by a hinge shaft 19A. The key cover 19 exposes a key cylinder 20 to the outside. The key cylinder 20 is housed in a cylinder chamber 21 formed in the inside of the tumbler 14, and a key hole of the key cylinder 20 faces upwardly. The key cylinder 20 is brought into contact with a mount member 23 made of a resin material which is mounted in the cylinder chamber 21 on a lower side, and the key cylinder 20 can be pushed by an amount corresponding to the compression of the mount member 23 generated by the insertion of the inserted key.

When a key is inserted so that the key cylinder 20 is displaced downwardly and is rotated, a lock state of the cap body 11 is released. More specifically, the key cylinder 20 includes an engaging member (not shown) which advances or retracts in the radial direction of the key cylinder 20 corresponding to the rotation of the key, and the release of the cap body 11 is restricted by engaging the engaging member with a stopper portion (not shown) mounted on the fuel tank 2.

A communication chamber 25 extends parallel to the cylinder chamber 21 and is formed in the tumbler 14 on a side of the cylinder chamber 21. A lower end portion of the communication chamber 25 opens inside the fuel tank 2, and is covered with a mesh-like filter member 24, for example, through which evaporated fuel and fuel in a liquid form can pass. An upper end portion of the communication chamber 25 is closed by the lower surface of the cap body 11.

Figure 3:
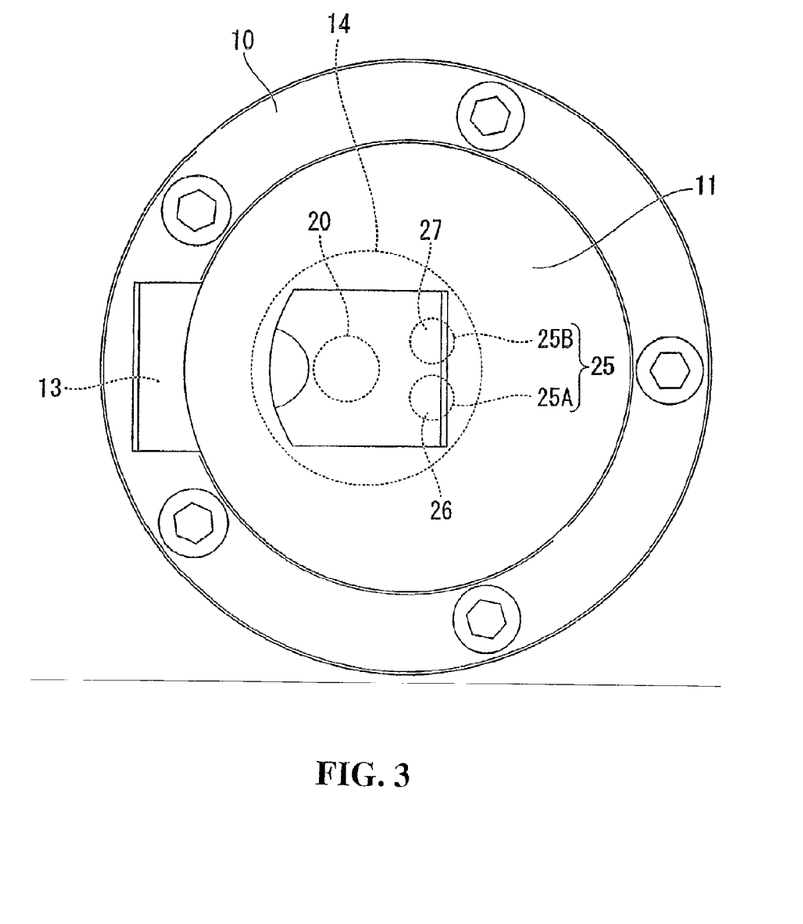
FIG. 3 is a top plan view of the fuel supply cap of the evaporated fuel treatment device according to the first embodiment of the present invention.

To explain the embodiment in conjunction with FIG. 3, the communication chamber 25 is formed of a pair of neighboring cylindrical portions 25A, 25B. The communication chamber 25 is formed in the tumbler 14 by boring, a negative pressure adjusting valve 26 is arranged in the cylindrical portion 25A, and a positive pressure adjusting valve 27 is arranged in the cylindrical portion 25B. The communication chamber 25 is separated into a fuel tank 2 inner side on a lower side of the communication chamber 25 and a fuel tank 2 outer side on an upper side communication chamber 25 by the negative pressure adjusting valve 26 and the positive pressure adjusting valve 27. The negative pressure adjusting valve 26 is biased from the fuel tank 2 inner side with a predetermined biasing force, and is opened when an inner pressure in the fuel tank 2 becomes a predetermined pressure or lower. The positive pressure adjusting valve 27 is biased from the fuel tank 2 outer side with a predetermined biasing force, and is opened when the inner pressure in the fuel tank 2 becomes a predetermined pressure or higher. The negative pressure adjusting valve 26 and the positive pressure adjusting valve 27 are arranged on a side opposite to the hinge 13 with respect to the key cylinder 20. The negative pressure adjusting valve 26 and the positive pressure adjusting valve 27 are arranged parallel to each other in the radial direction of the key cylinder 20.

As shown in FIG. 2, the negative pressure adjusting valve 26 is constituted of: a valve seat 28 formed in a radially inwardly projecting manner from an inner peripheral surface of the cylindrical portion 25A and having a hole portion 28A; a valve element 31 having a shaft portion 29 which is fitted into and is inserted into the hole portion 28A of the valve seat 28 and an umbrella portion 30 which is joined to a lower end of the shaft portion 29 and is brought into contact with the valve seat 28 from the inside of the fuel tank 2; and a spring 32 having one end thereof brought into contact with the filter member 24 and the other end thereof brought into contact with the umbrella portion 30 of the valve element 31 thus biasing the valve element 31. The spring 32 is arranged in a shrunken state between the filter member 24 and the valve element 31 so as to impart a predetermined biasing force to the valve element 31.

Figure 4:
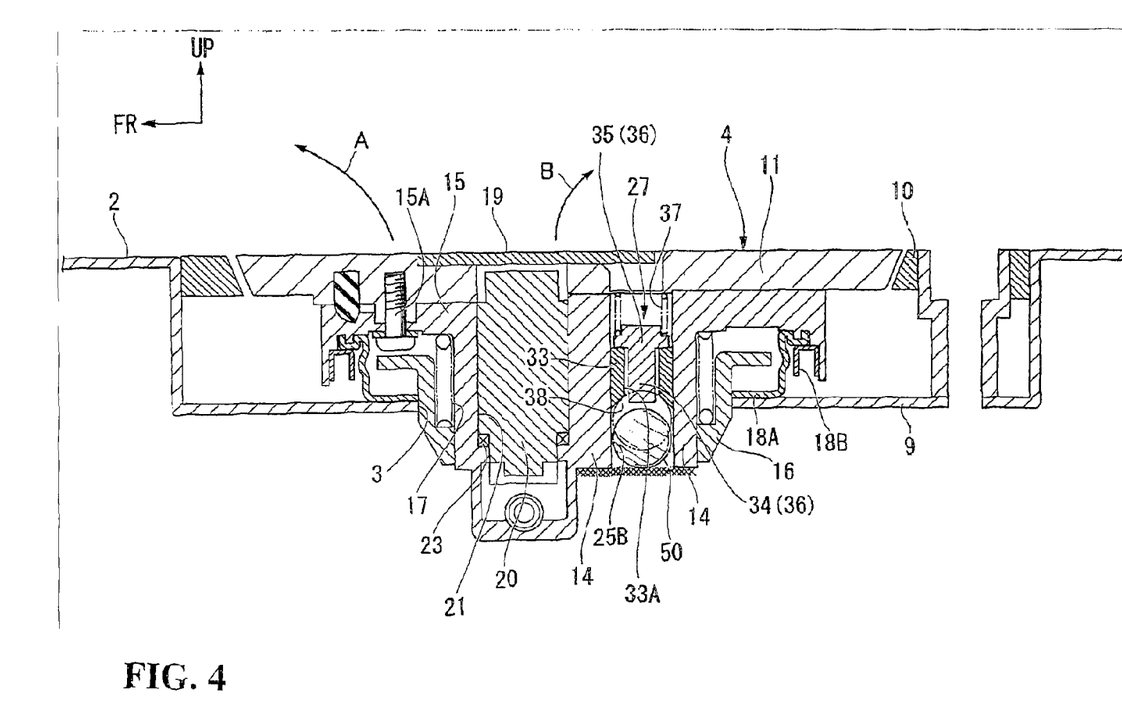
FIG. 4 is another cross-sectional view of the fuel supply cap of the evaporated fuel treatment device according to the first embodiment of the present invention.
Figure 5A:
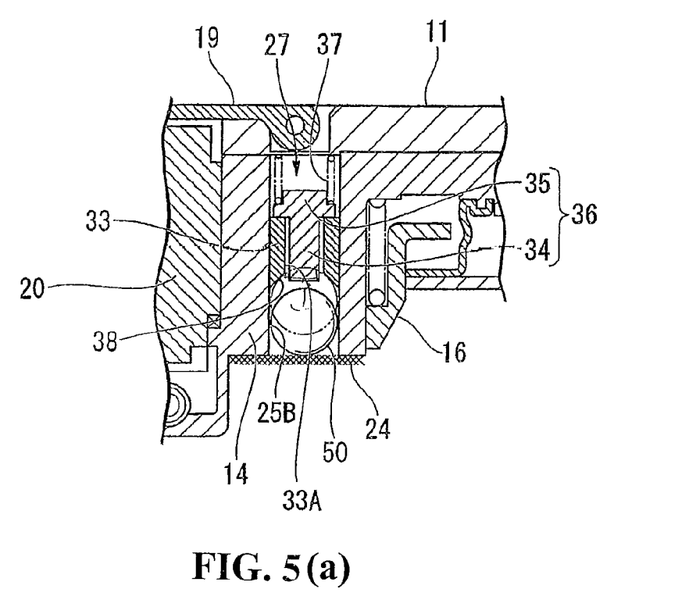
Figure 5B:
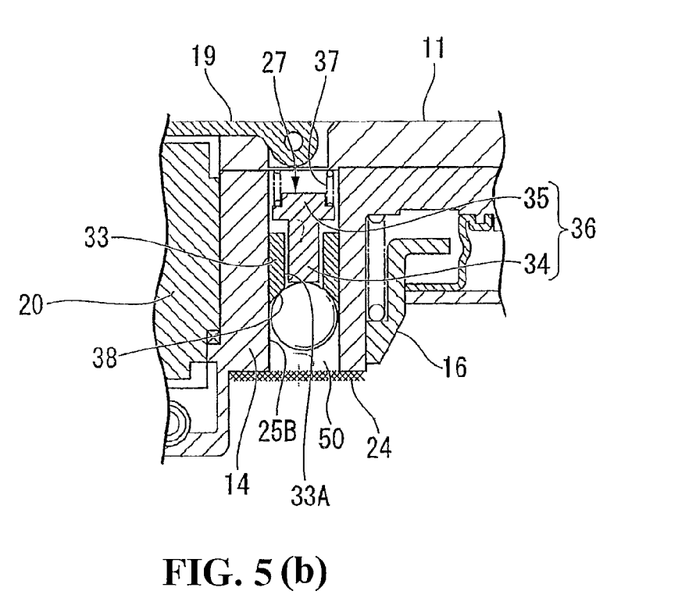

On the other hand, as shown in FIGS. 4, 5(*a*) and 5(*b*), the positive pressure adjusting valve 27 is constituted of: a valve seat 33 formed in a radially inwardly projecting manner from an inner peripheral surface of the cylindrical portion 25B and having a hole portion 33A; a valve element 36 having a shaft portion 34 which is inserted into the hole portion 33A of the valve seat 33 and an umbrella portion 35 which is joined to an upper end of the shaft portion 34 and is brought into contact with the valve seat 33 from the outside of the fuel tank 2; and a spring 37 having one end thereof brought into contact with a lower surface of the cap body 11 and the other end thereof brought into contact with the umbrella portion 35 of the valve element 36 thus biasing the valve element 36. In a closed state where the umbrella portion 35 is brought into contact with the valve seat 33, the shaft portion 34 projects downwardly from the valve seat 33 when the positive pressure adjusting valve 27 is in a closed state. The spring 37 is arranged in a shrunken state between the cap body 11 and the valve element 36 so as to impart a predetermined biasing force to the valve element 36.

An inclined portion 38 which gradually enlarges (increases) an inner diameter of the hole portion 33A in the downward direction is integrally formed with a lower portion of the valve seat 33, and a spherical rollover valve 50 freely movable between the valve seat 33 and the filter member 24 is housed in the cylindrical portion 25B below the valve seat 33. A diametric size (diameter) of the rollover valve 50 is set slightly smaller than a diametric size of the cylindrical portion 25B such that evaporated fuel passes. As shown in FIG. 5(*b*), The rollover valve 50 is also pushed by fuel which intrudes into the cylindrical portion 25B when the fuel tank 2 is inclined at a predetermined angle or more so that the rollover valve 50 pushes up the shaft portion 29 of the positive pressure adjusting valve 27 thus closing the valve seat 33 (inclined portion 38) so as to prevent the flowout of fuel. Since the rollover valve 50 is brought into contact with the inclined portion 38, the close contact property of both elements is enhanced.

To explain this embodiment in conjunction with FIG. 2, upper end portions of the cylindrical portions 25A, 25B are closed by the lower surface of the cap body 11. On the other hand, upper spaces of the cylindrical portions 25A, 25B separated from the inside of the fuel tank 2 by the negative pressure adjusting valve 26 and the positive pressure adjusting valve 27 are communicated with each other, and a cap inner charge passage 39 extending in the radial direction of the flange portion 15 from an inner peripheral surface of an upper portion of the cylindrical portion 25A is formed. The cap inner charge passage 39 penetrates the inside of the flange portion 15, and opens downwardly in a space formed between the cap body 11 and the seat portion 9.

A cylindrical elastic member 40 having a cylindrical shape is hermetically joined to the downwardly directed opening of the cap inner charge passage 39. A lower end portion of the cylindrical elastic member 40 is brought into close contact with the seat portion 9 in a state where the cap body 11 is closed, and covers a communication opening 41 formed in the seat portion 9. The communication opening 41 is a hole which penetrates into the inside of the fuel tank 2 from the seat portion 9, and is hermetically connected to the charge pipe 5 arranged in the inside of the fuel tank 2. Due to such a constitution, a passage extending from the inside of the fuel tank 2 to the evaporated fuel storage unit 6 is formed.

As shown in FIG. 2, a through hole 42 which allows an upper portion of the cylinder chamber 21 and an upper portion of the cylindrical portion 25A to be communicated with each other is formed in the tumbler 14, and a pushing member 43 is inserted into the through hole 42. Further, a diaphragm chamber 44 which allows a lower portion of the cylinder chamber 21 and a lower portion of the communication chamber 25 to be communicated with each other is formed in the tumbler 14.

The through hole 42 opens on a fuel tank 2 outer side of the cylindrical portion 25A partitioned by the negative pressure adjusting valve 26, and the pushing member 43 is arranged such that one end of the pushing member 43 is fixed to the key cylinder 20, and the other end of the pushing member 43 faces the inside of the communication chamber 25 and is brought into contact with an upper end of the shaft portion 29 of the valve element 31 of the negative pressure adjusting valve 26. The pushing member 43 is displaced downwardly in an interlocking manner with the downward movement of the key cylinder 20 so that the valve element 31 is pushed downwardly such that the negative pressure adjusting valve 26 is forcibly opened.

On the other hand, the diaphragm chamber 44 is formed such that the diaphragm chamber 44 is indented toward a key cylinder 20 side from a fuel tank 2 inner side of the cylindrical portion 25A partitioned by the negative pressure adjusting valve 26, and the diaphragm chamber 44 has a communication passage 44A penetrating into the cylinder chamber 21 so that the diaphragm chamber 44 is communicated with the cylinder chamber 21. A diaphragm 45 is arranged in the inside of the diaphragm chamber 44, and a cylinder chamber 21 side of the diaphragm chamber 44 is separated from the inside of the fuel tank 2 by gas-phase separation with the diaphragm 45 sandwiched therebetween.

An engaging groove 46 having a recessed shape is formed on an outer peripheral surface of the key cylinder 20 in the inside of the cylinder chamber 21 on the extension of the communication chamber 44A, and an engaging pin 47 engageable with the engaging groove 46 is joined to the diaphragm 45. In the inside of the diaphragm chamber 44 on a communication passage 44A side, a biasing member 48 is housed. The biasing member 48 biases the diaphragm 45 in the direction, along which the engagement of the engaging pin 47 with the engaging groove 46 is prevented against an inner pressure in the fuel tank 2. Due to such a constitution, the diaphragm 45 compresses the biasing member 48 when the inner pressure in the fuel tank 2 is high so that the engaging pin 47 is engaged with the engaging groove 46, thereby restricting the rotation of the key cylinder 20. On the other hand, in the case where an inner pressure in the fuel tank 2 is leveled to the atmospheric pressure, the diaphragm 45 is biased by the biasing member 48 such that the engagement of the engaging pin 47 with the engaging groove 46 is released, thereby allowing the rotation of the key cylinder 20.

In the embodied evaporated fuel treatment device 1, when an inner pressure in the fuel tank 2 becomes a predetermined pressure or lower so that the negative pressure adjusting valve 26 is opened, the fuel tank 2 and the charge pipe 5 are communicated with each other through the fuel supply cap 4. Therefore, the atmospheric air can be fed to the fuel tank 2 from the evaporated fuel storage unit 6 through the charge pipe 5. On the other hand, when an inner pressure in the fuel tank 2 becomes a predetermined pressure or higher, by opening the positive pressure adjusting valve 27, the fuel tank 2 and the charge pipe 5 are communicated with each other through the fuel supply cap 4. Therefore, evaporated fuel generated in the fuel tank 2 can be fed to the evaporated fuel storage unit 6 through the charge pipe 5.

Figure 6:
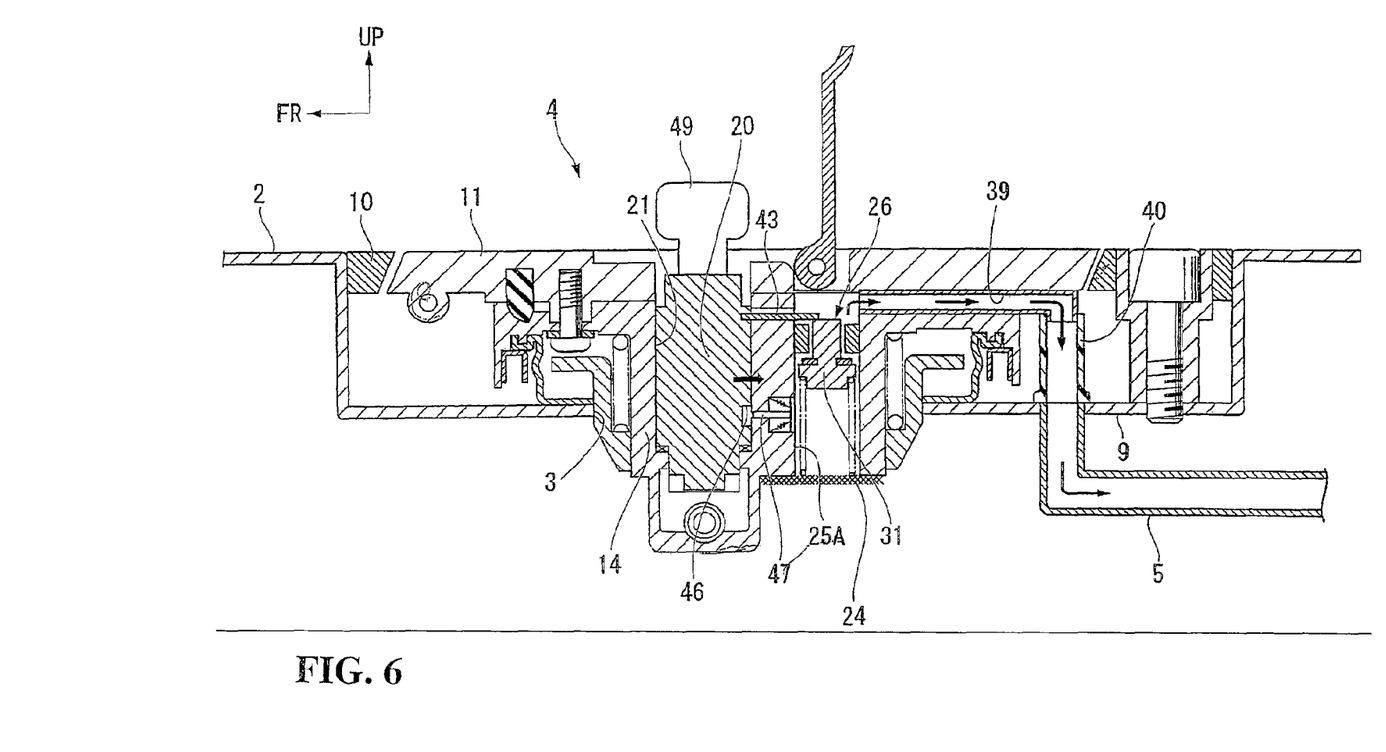
FIG. 6 is a view explaining the manner of operation of the evaporated fuel treatment device according to the first embodiment of the present invention.

To explain this embodiment in conjunction with FIG. 6, when the key cylinder 20 is pushed down by a key 49 which is inserted into the key cylinder 20, the pushing member 43 pushes down the valve element 31 of the negative pressure adjusting valve 26 so that the negative pressure adjusting valve 26 is opened. When the negative pressure adjusting valve 26 is opened in this manner, as can be understood by reference to the arrow in FIG. 6, an inner pressure in the fuel tank 2 is released to an evaporated fuel storage unit 6 side through the cylindrical portion 25A, the cap inner charge passage 39, the cylindrical elastic member 40 and the charge pipe 5. When an inner pressure in the fuel tank 2 is lowered, the engaging pin 47 is moved in the direction indicated by an arrow in FIG. 6 so that the engagement of the engaging pin 47 with the engaging groove 46 is released thus allowing the rotation of the key cylinder 20 so that the fuel supply cap 4 can be opened.

In the evaporated fuel treatment device 1 according to the first embodiment of the present invention, the spherical rollover valve 50 is arranged on the fuel tank 2 inner side of the cylindrical portion 25B where the positive pressure adjusting valve 27 is provided. The spherical rollover valve 50 closes the positive pressure adjusting valve 27 when the fuel tank 2 is inclined at a predetermined angle or more. Due to such a structure, the positive pressure adjusting valve 27 and the rollover valve 50 for preventing liquid leakage are arranged parallel to each other in the longitudinal direction of the fuel supply cap 4 (the axial direction of the fuel filling port 3 to be closed). Therefore, evaporated fuel can be treated while maintaining the fuel supply cap 4 in a compact shape, and the flowout of fuel in the fuel tank 2 can be preferably prevented.

Further, the positive pressure adjusting valve 27 includes the annular valve seat 33 which projects in a radially inward direction from the inner peripheral surface of the cylindrical portion 25B, the umbrella portion 35 which is biasingly brought into contact with the end surface of the valve seat 33, and the shaft portion 34 which is fitted in the inner peripheral side of the valve seat 33, and the positive pressure adjusting valve 27 is arranged such that the shaft portion 34 projects from the valve seat 33 when the positive pressure adjusting valve 27 is in a closed state. Due to such a structure, the shaft portion 34 projects from the valve seat 33 in a state where the fuel tank 2 is not inclined. Therefore, sticking of the rollover valve 50 to the valve seat 33 can be prevented.

With respect to the relationship between the valve element 36 (the umbrella portion 35 and the shaft portion 34) and the spring 37, it is preferable that a load obtained by adding a load of the umbrella portion 35 and a load of the shaft portion 34 to a biasing force of the spring 37 applied to the umbrella portion 35 is set larger than a load of the rollover valve 50, and a biasing force of the spring 37 applied to the umbrella portion 35 is set smaller than the load of the rollover valve 50. When such load relationship is established, the shaft portion 34 can project from the valve seat 33 with the fuel tank 2 in a standing state with certainty thus preventing sticking of the rollover valve 50 to the valve seat 33. Further, when the fuel tank 2 is inclined at a predetermined angle or a larger angle, the rollover valve 50 pushes up the shaft portion 34 due to a dead weight thereof and a load which the rollover valve 50 receives from fuel intruding into the inside of the cylindrical portion 25B so that the positive pressure adjusting valve 27 can be opened.

Further, in the embodiment of the present invention, a diameter of the rollover valve 50 is set slightly smaller than a diameter of the cylindrical portion 25B by an amount which allows passing of evaporated fuel. In this case, when the fuel tank 2 is inclined so that the liquid fuel reaches the cylindrical portion 25B, the rollover valve 50 is pushed due to the flow of the liquid fuel and, thereafter, the rollover valve 50 pushes up the positive pressure adjusting valve 27 thus closing the valve seat 33. Here, the diameter of the rollover valve 50 is slightly smaller than the diameter of the cylindrical portion 25B so that the rollover valve 50 becomes relatively large-sized whereby a weight of the liquid fuel is loaded on the rollover valve 50 thus closing the valve seat 33 tightly.

Further, the fuel supply cap 4 includes the key cylinder 20 and the hinge 13 so that the fuel supply cap 4 is connected to the fuel tank 2 in an openable/closable manner by the hinge 13, and the positive pressure adjusting valve 27 and the negative pressure adjusting valve 26 are arranged adjacent to each other, and are arranged on a side opposite to the hinge 13 with respect to the key cylinder 20. Due to such a structure, by arranging the relatively large key cylinder 20 at a position close to the hinge 13, it is possible to easily design a smaller-sized fuel supply cap 4 which does not interfere with the fuel filling port 3 at the time of opening or closing the fuel tank.

Second Embodiment

Next, a second embodiment of the present invention is explained. In this embodiment, constitutional elements of this embodiment substantially the same as the corresponding constitutional elements of the first embodiment are designated with the same symbols, and the explanation of these elements is omitted.

Figure 7:
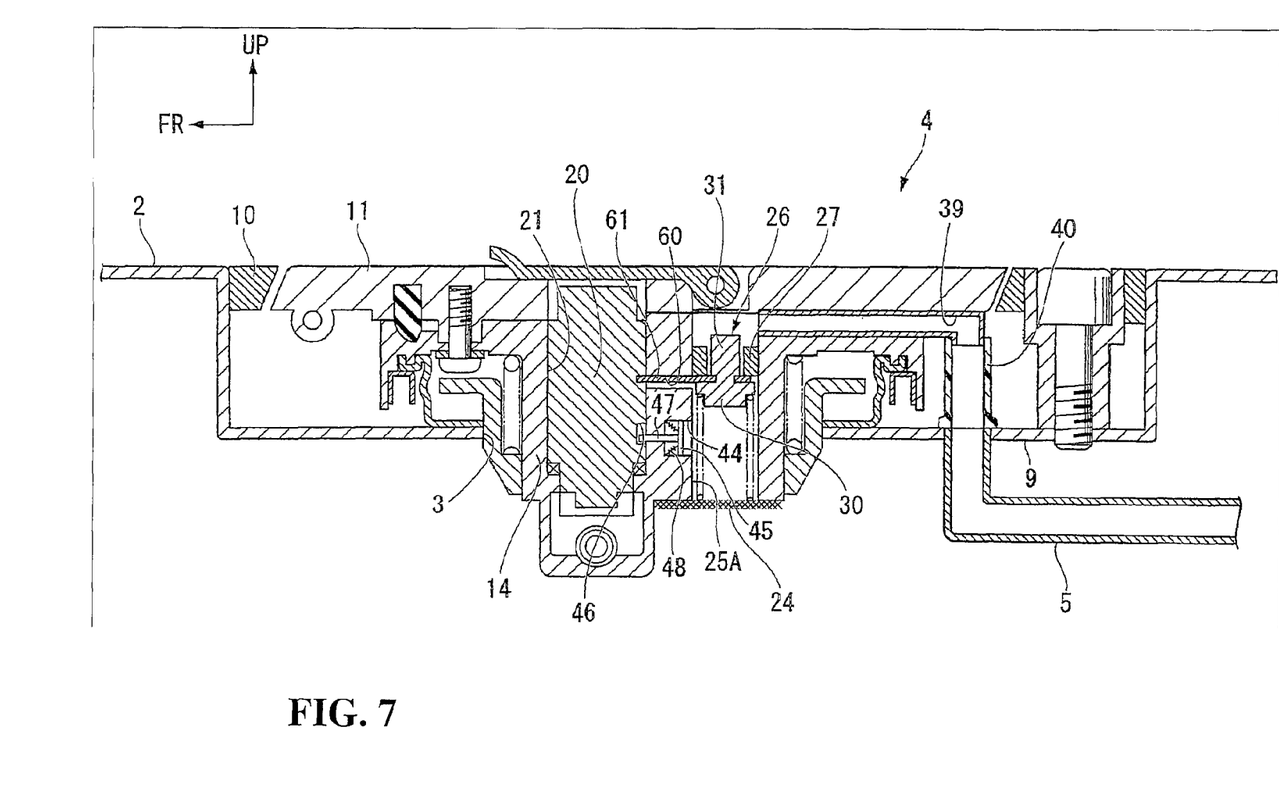
FIG. 7 is a cross-sectional view of a fuel supply cap of an evaporated fuel treatment device according to a second embodiment of the present invention.

As shown in FIG. 7, in this embodiment, a through hole 60 is formed in a tumbler 14 between a cylinder chamber 21 and a cylindrical portion 25A, and the through hole 60 opens on a fuel tank 2 inner side of the cylindrical portion 25A partitioned by a negative pressure adjusting valve 26 (valve seat 28). A pushing member 61 is inserted into the through hole 60, and has one end thereof fixed to a key cylinder 20 and the other end thereof brought into contact with an umbrella portion 30 of a valve element 31 from above in a state where the other end faces the inside of the cylindrical portion 25A. The other end of the pushing member 61 is sandwiched between the valve seat 28 and the umbrella portion 30 of the valve element 31, air tightness is maintained in such a state, and the pushing member 61 is displaced downwardly in an interlocking manner with the downward movement of the key cylinder 20. With such a constitution in this embodiment, an axial length of the cylinder chamber 21 of the tumbler 14 can be shortened.

Third Embodiment

Next, a third embodiment of the present invention is explained. This embodiment differs from the first embodiment with respect to the constitution of the diaphragm 45. In this embodiment, constitutional elements of this embodiment substantially the same as the corresponding constitutional elements of the first embodiment are designated with the same symbols, and the explanation of these elements is omitted.

Figure 8:
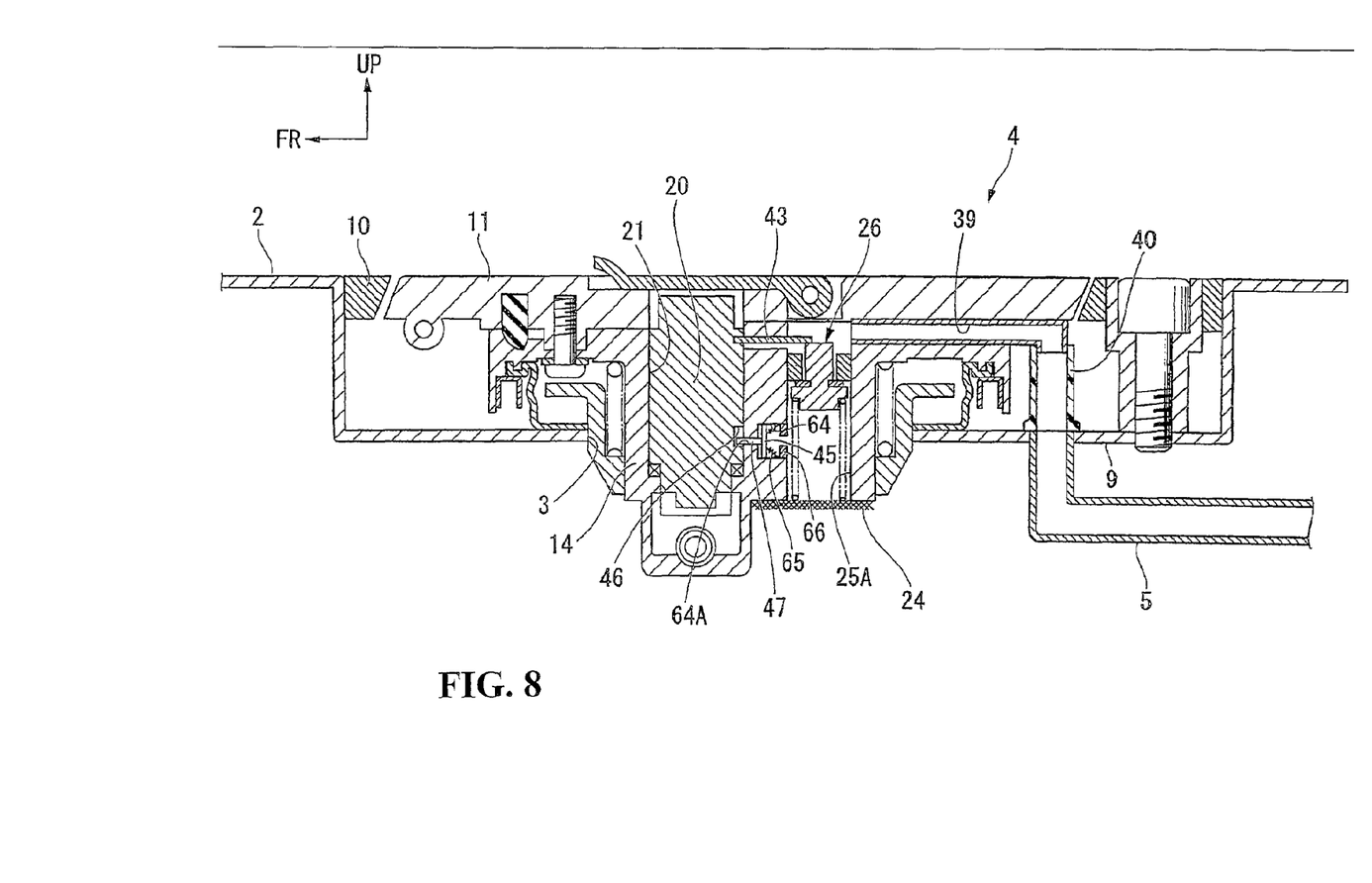
FIG. 8 is a cross-sectional view of a fuel supply cap of an evaporated fuel treatment device according to a third embodiment of the present invention.

As shown in FIG. 8, in this embodiment, in the same manner as the first embodiment, a diaphragm chamber 64 extending over a key cylinder 20 and the cylindrical portion 25A is formed in the tumbler 14. The diaphragm chamber 64 is formed such that the diaphragm chamber 64 is indented toward the key cylinder 20 side from the fuel tank 2 inner side of the cylindrical portion 25A partitioned by the negative pressure adjusting valve 26, and the diaphragm chamber 64 has a communication passage 64A penetrating into the cylinder chamber 21 so that the diaphragm chamber 64 is communicated with the cylinder chamber 21. In the inside of the diaphragm chamber 64 on the fuel tank 2 side, a biasing member 65 is housed. The biasing member 65 biases the diaphragm 45 in the direction, along which the engaging pin 47 is engaged with the engaging groove 46 against an atmospheric pressure on the communication passage 44A side. The biasing member 65 has one end thereof supported on a projecting member 66 formed on an edge portion of the diaphragm chamber 64 on the fuel tank 2 side.

In this embodiment, when an inner pressure in the fuel tank 2 is high, the diaphragm 45 receives a tank inner pressure, and the engaging pin 47 is engaged with the engaging groove 46 by being biased by the biasing member 65, thereby restricting the rotation of the key cylinder 20. On the other hand, when the inner pressure in the fuel tank 2 is lowered and becomes below an atmospheric pressure on the communication passage 44A side, the diaphragm 45 is displaced against a biasing force of the biasing member 65. Therefore, the engagement between the engaging pin 47 and the engaging groove 46 is released such that the rotation of the key cylinder 20 is allowed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An evaporated fuel treatment device for a vehicle comprising:
   a fuel tank for storing fuel;
   a fuel supply cap for opening and closing a fuel filling port of the fuel tank;
   an evaporated fuel storage unit storing evaporated fuel using an absorption agent;
   a charge passage allowing communication between the fuel tank and the evaporated fuel storage unit;
   a communication chamber formed in the fuel supply cap, the communication chamber allowing communication between the charge passage and an inside of the fuel tank, wherein the communication chamber is formed of a pair of cylindrical portions and has one end opened toward the charge passage and the other end opened in an inside of the fuel tank;

a positive pressure adjusting valve in one of the cylindrical portions, the positive pressure adjusting valve being opened when an inner pressure of the fuel tank becomes a first predetermined pressure or higher such that the evaporated fuel generated in the fuel tank is supplied to the evaporated fuel storage unit through the one of the cylindrical portions and the charge passage;

a negative pressure adjusting valve in the other one of the cylindrical portions, the positive pressure adjusting valve being opened when the inner pressure of the fuel tank becomes a second predetermined pressure or lower such that atmospheric air is supplied to the fuel tank from the evaporated fuel storage unit through the other one of the cylindrical portions and the charge passage; and a spherical rollover valve arranged on a fuel tank inner side of the one of the cylindrical portions, the spherical rollover valve closing the positive pressure adjusting valve when the fuel tank is inclined at an angle equal to or larger than a predetermined angle.

2. The evaporated fuel treatment device for a vehicle according to claim 1, wherein a diameter of the spherical rollover valve is slightly smaller than a diameter of the one of the cylindrical portions by an amount which allows passing of the evaporated fuel.

3. The evaporated fuel treatment device for a vehicle according to claim 1, wherein the positive pressure adjusting valve includes:

an annular valve seat projecting in a radially inward direction from an inner peripheral surface of the one of the cylindrical portions;

an umbrella portion biasingly brought into contact with an end surface of the valve seat; and a shaft portion joined to the umbrella portion and fitted in an inner peripheral side of the valve seat, wherein the positive pressure adjusting valve is arranged in an inside of the one of the cylindrical portions such that the shaft portion projects from the valve seat in a closed state where the umbrella portion is brought into contact with the valve seat.

4. The evaporated fuel treatment device for a vehicle according to claim 3, wherein a load obtained by adding a load of the umbrella portion and a load of the shaft portion to a biasing force applied to the umbrella portion is set larger than a load of the spherical rollover valve, a biasing force applied to the umbrella portion is set smaller than the load of the spherical rollover valve, the shaft portion projects from the valve seat with the fuel tank in a standing state thus preventing sticking of the spherical rollover valve to the valve seat, and when the fuel tank is inclined at a predetermined angle or larger, the spherical rollover valve pushes up the shaft portion due to a dead weight thereof and a load which the spherical rollover valve receives from fuel intruding into the inside of the one of the cylindrical portions so that the positive pressure adjusting valve is opened by being pushed spherical rollover valve and the valve seat is closed by the spherical rollover valve.

5. The evaporated fuel treatment device for a vehicle according to claim 1, wherein the fuel supply cap includes a key cylinder and a hinge so that the fuel supply cap is connected to the fuel tank in an openable/closable manner by the hinge, and the positive pressure adjusting valve and the negative pressure adjusting valve are arranged adjacent to each other, and are arranged on a side opposite to the hinge with respect to the key cylinder.

6. The evaporated fuel treatment device for a vehicle according to claim 2, wherein the fuel supply cap includes a key cylinder and a hinge so that the fuel supply cap is connected to the fuel tank in an openable/closable manner by the hinge, and the positive pressure adjusting valve and the negative pressure adjusting valve are arranged adjacent to each other, and are arranged on a side opposite to the hinge with respect to the key cylinder.

7. The evaporated fuel treatment device for a vehicle according to claim 3, wherein the fuel supply cap includes a key cylinder and a hinge so that the fuel supply cap is connected to the fuel tank in an openable/closable manner by the hinge, and the positive pressure adjusting valve and the negative pressure adjusting valve are arranged adjacent to each other, and are arranged on a side opposite to the hinge with respect to the key cylinder.

8. The evaporated fuel treatment device for a vehicle according to claim 1, further comprising a purge passage allowing communication between the evaporated fuel storage unit and an intake system of an internal combustion engine.

9. An evaporated fuel treatment device for a vehicle comprising:

a fuel tank for storing fuel;

a fuel supply cap for opening and closing a fuel filling port of the fuel tank;

an evaporated fuel storage unit storing evaporated fuel using an absorption agent;

a charge passage allowing communication between the fuel tank and the evaporated fuel storage unit;

a communication chamber formed in the fuel supply cap, the communication chamber allowing communication between the charge passage and an inside of the fuel tank, wherein the communication chamber has a pair of cylindrical portions and has one end opened toward the charge passage and the other end opened in an inside of the fuel tank;

a positive pressure adjusting valve in one of the cylindrical portions, the positive pressure adjusting valve being opened when an inner pressure of the fuel tank becomes a first predetermined pressure or higher such that the evaporated fuel generated in the fuel tank is supplied to the evaporated fuel storage unit through the one of the cylindrical portions and the charge passage;

a negative pressure adjusting valve in the other one of the cylindrical portions, the positive pressure adjusting valve being opened when the inner pressure of the fuel tank becomes a second predetermined pressure or lower such that atmospheric air is supplied to the fuel tank from the evaporated fuel storage unit through the other one of the cylindrical portions and the charge passage; and a spherical rollover valve arranged in the one of the cylindrical portions and below the positive pressure adjusting valve, the spherical rollover valve closing the positive pressure adjusting valve when the fuel tank is inclined at an angle equal to or larger than a predetermined angle.

10. The evaporated fuel treatment device for a vehicle according to claim 9, wherein a diameter of the spherical rollover valve is slightly smaller than a diameter of the one of the cylindrical portions by an amount which allows passing of the evaporated fuel.

11. The evaporated fuel treatment device for a vehicle according to claim 9, wherein the positive pressure adjusting valve includes:
- an annular valve seat projecting in a radially inward direction from an inner peripheral surface of the one of the cylindrical portions;
- an umbrella portion biasingly brought into contact with an end surface of the valve seat; and
- a shaft portion joined to the umbrella portion and fitted in an inner peripheral side of the valve seat,
- wherein the positive pressure adjusting valve is arranged in an inside of the one of the cylindrical portions such that the shaft portion projects from the valve seat in a closed state where the umbrella portion is brought into contact with the valve seat.

12. The evaporated fuel treatment device for a vehicle according to claim 11, wherein a load obtained by adding a load of the umbrella portion and a load of the shaft portion to a biasing force applied to the umbrella portion is set larger than a load of the spherical rollover valve,
- a biasing force applied to the umbrella portion is set smaller than the load of the spherical rollover valve,
- the shaft portion projects from the valve seat with the fuel tank in a standing state thus preventing sticking of the spherical rollover valve to the valve seat, and
- when the fuel tank is inclined at a predetermined angle or larger, the spherical rollover valve pushes up the shaft portion due to a dead weight thereof and a load which the spherical rollover valve receives from fuel intruding into the inside of the one of the cylindrical portions so that the positive pressure adjusting valve is opened by being pushed by the spherical rollover valve and the valve seat is closed by the spherical rollover valve.

13. The evaporated fuel treatment device for a vehicle according to claim 9, wherein the fuel supply cap includes a key cylinder and a hinge so that the fuel supply cap is connected to the fuel tank in an openable/closable manner by the hinge, and
- the positive pressure adjusting valve and the negative pressure adjusting valve are arranged adjacent to each other, and are arranged on a side opposite to the hinge with respect to the key cylinder.

14. The evaporated fuel treatment device for a vehicle according to claim 9, further comprising a purge passage allowing communication between the evaporated fuel storage unit and an intake system of an internal combustion engine.

* * * * *